Feb. 11, 1964
R. J. VODRA ETAL
3,120,780
HIGH TEMPERATURE STRAIN GAGE
Filed Nov. 14, 1960
2 Sheets-Sheet 2
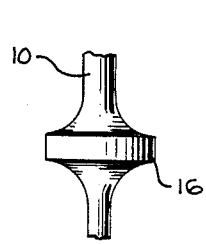
Fig. 2
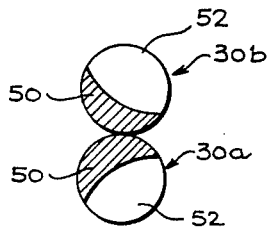
Fig. 3
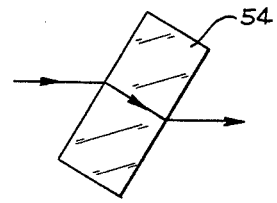
Fig. 4
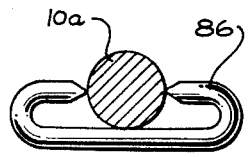
Fig. 5
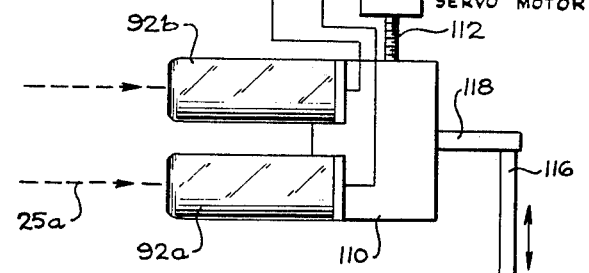
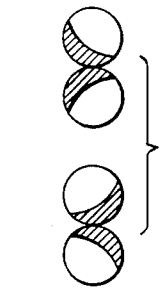
Fig. 5a
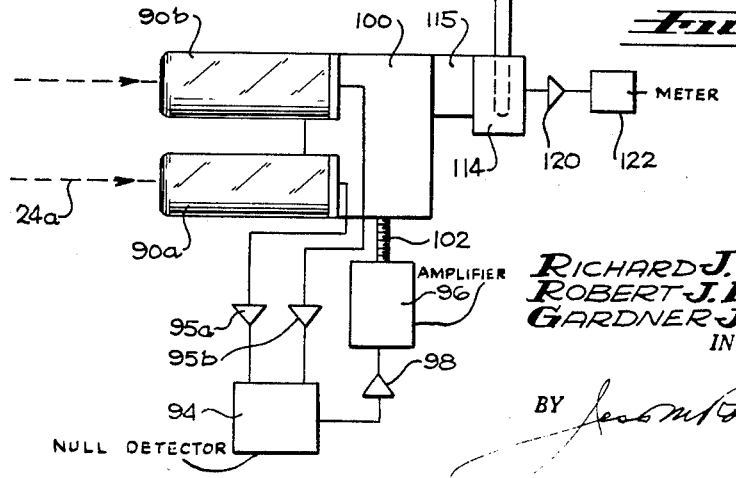
Fig. 6
RICHARD J. VODRA
ROBERT J. LINTELL
GARDNER JOHNSON
INVENTORS
BY Jesse M. Roberts
ATTORNEY

United States Patent Office 3,120,780
Patented Feb. 11, 1964

3,120,780
HIGH TEMPERATURE STRAIN GAGE
Richard J. Vodra, Redondo Beach, Robert J. Lintell, Thousand Oaks, and Gardner Johnson, Los Angeles, Calif., assignors to Coleman Engineering Company, Inc., Torrance, Calif., a corporation of California
Filed Nov. 14, 1960, Ser. No. 69,070
5 Claims. (Cl. 88—14)

This invention relates to a means for and a method of measuring the deformation of specimens in response to stress.

One problem to which the invention is directed is to measure the strain or deformation of a specimen when the specimen is heated to a high temperature, for example, a temperature exceeding 1500° F. The difficulty is that any part of the measuring means that touches the heated specimen or is in close proximity to the specimen is heated by conduction or radiation or both. Consequently at least a portion of the measuring means must withstand the high temperature.

A second problem is to achieve a high degree of accuracy in measuring the deformation of the specimen, say accuracy within a tolerance of 0.0001 inch or less. Such a high degree of accuracy is difficult even under favorable conditions. Under high temperature conditions accuracy is much more difficult to attain with conventional techniques because of the necessity of employing components capable of withstanding heat and because of errors arising from thermal expansion of parts of the measuring apparatus. Conventional extensometers apply critical side loads to specimens at higher temperatures.

The invention solves both of these problems by providing the test specimen with at least one distinctive reference element and by employing optical means remote from the specimen to detect the movements of the reference elements that are occasioned by distortion of the specimen under the applied stress. In this regard a feature of one practice of the invention is the concept of merely locally enlarging a portion of the test specimen to provide the reference element. In other practices of the invention the reference element is a target that clamps onto the specimen.

By virtue of this approach, the only part of the strain measuring system that is subjected to the high temperature of the test specimen is the reference element. All of the actual measuring system is remote from the heated specimen. A further teaching of the invention is a certain reversal in the optics when the reference element approaches incandescence. In the lower temperature ranges a light source is used to project a profile image or shadow of the reference element. In the upper temperature ranges the reference element itself is used as a light source to produce an illuminated image. This reversal avoids any limit on the temperature range.

Broadly described, the basic combination of the invention comprises at least one distinctive reference element on the specimen, photosensitive means, means to direct an image of the reference element onto the photosensitive means, and servo means responsive to the photosensitive means either to adjust the position of the photosensitive means or to adjust the position of the image-directing means as required to keep the image on the photosensitive means. The amount of such adjustment is the measure of the shift of the reference element on the test specimen. Preferably the photosensitive means comprises a cooperating pair of photosensitive elements and the responsive means for effecting automatic adjustment comprises a null detector connected to the pair of photosensitive means by a corresponding pair of amplifiers together with a servo motor actuated by a servo amplifier under the control of the null detector. It has been found that this arrangement can be designed for an extremely high degree of inherent accuracy.

One of the most important features of the invention is the ability to record continuously on any oscillogram, producing an automatic stress-strain curve.

It is contemplated that in most practices of the invention two reference elements will be provided at spaced points on the test specimen together with two corresponding photosensitive means and two corresponding automatic adjustment means to measure the shift of the two reference elements respectively. The measurement of the strain is, of course, the difference between the shifts of the two reference elements. A feature of the invention is the use of a differential arrangement responsive to both of the two automatic adjustment means to obtain a direct indication or reading of the magnitude of the strain.

In a preferred practice of the invention wherein two light beams project images of two reference elements respectively, the differential indication is created by using the servo motor of one of the two automatic adjustment means to shift both of the light beams equally as required to keep one of the images centered on the corresponding photosensitive means and by using the servo motor of the second adjustment means to shift the second light beam a second time as required to keep the second image centered on the second photosensitive means. As will be made clear, the magnitude of the second shift of the second light beam corresponds to the magnitude of the movement of the two reference elements relative to each other.

In another differential arrangement each of the two automatic adjustment means responds only to the shift of the corresponding reference element and a differential transducer responds to both of the two automatic adjustment means to measure the movement of the two reference elements relative to each other. Thus in this last practice of the invention the light beams move with the reference elements instead of being shifted to compensate for movements of the reference elements. It is the two photosensitive means that are shifted to follow the two light beams instead of being stationary.

The various features and advantages of the invention may be understood from the following detailed description and the accompanying drawings.

In the drawings, which are to be regarded as merely illustrative:

FIG. 2 is a side elevation of a portion of a test specimen showing how the test specimen may be locally enlarged to provide a distinctive reference element;

FIG. 3 is a schematic view showing how the image of the reference element in FIG. 2 is divided between two photosensitive means;

FIG. 4 shows schematically how an optical flat shifts a light beam laterally;

FIG. 5 is a transverse section of a test specimen showing how a target member may grip the test specimen to serve as a reference element;

FIG. 5a is a diagram showing how the two pairs of phototubes may receive opposite halves of the images of the two references means; and FIG. 6 is a schematic diagram illustrating a second embodiment of the invention.

Figure 1:
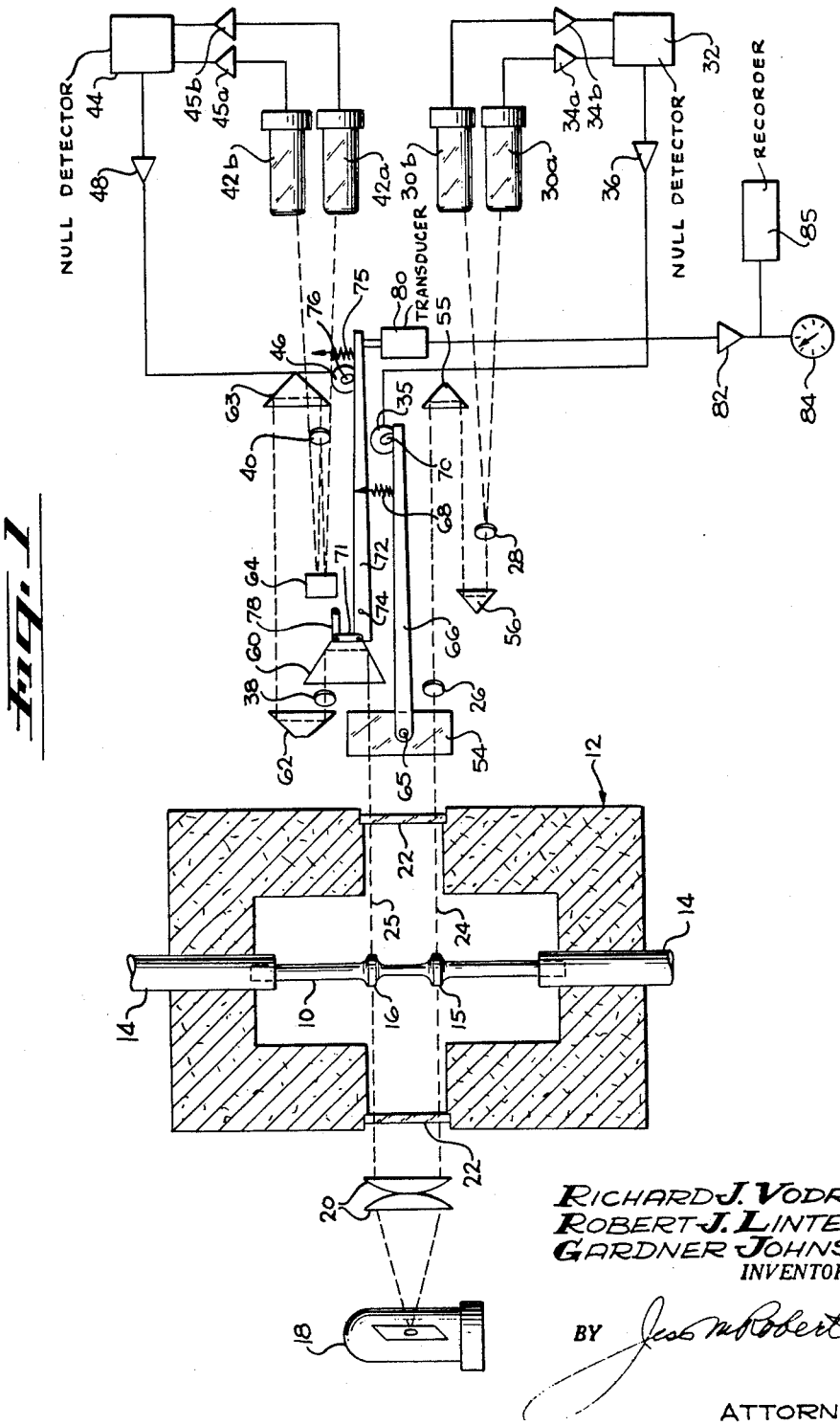
FIG. 1 is a schematic diagram of the preferred embodiment of the invention.

FIG. 1 shows a test specimen 10 inside a furnace 12 with the opposite ends of the test specimen engaged by a testing apparatus 14 which stresses the specimen in tension or compression. The test specimen is provided with a first distinctive reference element 15 and a second similar reference element 16. In this instance the reference elements 15 and 16 are integral enlargements of the test specimen 10, each of the enlargements being tapered in opposite longitudinal directions as shown in FIG. 2. The two reference elements 15 and 16 are positioned in a transverse bundle of light created by a light source 18 and collimating lenses 20. For this purpose the opposite walls of the furnace 12 may be provided with quartz windows 22.

The bundle of light through the furnace is effective to create two parallel light beams which image the two reference elements 15 and 16 in shadow profile. If the two reference elements 15 and 16 are raised in temperature to approach incandescence, the reference elements 15 and 16 become light sources to create their own light beams for projecting illuminated images of the reference elements and at such times the light source 18 is cut off. The first light beam that images the first reference element 15 is indicated at 24 and the second light beam that images the second reference element 16 is indicated at 25.

The first light beam 24 passes through an objective lens 26 and through a magnifying lens 28 to project an enlarged image of the first reference means 15 onto a first photosensitive means in the form of a pair of multiplier phototubes 30a and 30b. The two phototubes 30a and 30b are connected to a bridge type null detector 32 by means of corresponding input amplifiers 34a and 34b. The null detector 32 is connected in turn to a servo motor 35 by means of a servo amplifier 36.

In like manner the second light beam 25 that images the second reference element 16 passes through an objective lens 38 and a magnifying lens 40 to project an image of the second reference element onto a photosensitive means in form of a pair of multiplier phototubes 42a and 42b. The two phototubes 42a and 42b are connected to a null detector 44 by corresponding input amplifiers 45a and 45b and the null detector in turn is connected to a servo motor 46 by a servo amplifier 48.

FIG. 3 shows how the image of the first reference element 15, for example, is centered on the two phototubes 30a and 30b. The effective area of each of the two phototubes comprises an image area 50 and a background area 52. When the test specimen 10 is in the lower temperature ranges the image areas 50 are shadow areas and the background areas 52 are illuminated areas. When the reference element is heated to a sufficiently high temperature to radiate light and the light source 18 is cut off, the image areas 50 of the phototubes are illuminated and the background areas 52 are relatively dark. The null detector 32 that is associated with the two phototubes 30a and 30b is of a well known construction employing a Wheatstone bridge to seek an adjustment at which the two phototubes are equally illuminated with the image areas 50 of the two phototubes equal and with the background areas 52 equal.

Within the scope of the invention the various arrangements may be employed whereby the two servo motors serve to center the images of the two reference elements on the two pairs of phototubes.

In the arrangement shown in FIG. 1 the first light beam 24 that projects the image of the first reference element 15 passes through a transparent micrometer plate or optical flat 54 to a reflecting prism 55. The light beam 24 is reversed in direction by the reflecting prism 55 and is again reversed in direction by a second reflecting prism 56 which directs the beam onto the pair of photo-tubes 30a and 30b. If the optical flat 54 is perpendicular to the incident light beam 24 the light beam passes straight through the optical flat. If the optical flat is progressively rotated clockwise from its perpendicular position the light beam that is transmitted from the optical flat is progressively offset laterally downward as viewed in FIG. 1 without change in the direction of the light beam. Thus as the incident beam on the optical flat 54 from the reference element 15 is shifted upward by upward shift of the reference element under the stress applied to the specimen, the optical flat 54 may be rotated clockwise to compensate for the upward shift and thus keep the ultimately transmitted beam constant.

The second beam 25 that images the second reference element 16 passes through the same optical flat 54 and is reversed by a relatively large reflecting prism 60. The second light beam then is reflected in succession by three reflecting prisms 62, 63 and 64 before it reaches the pair of phototubes 42a and 42b. If the optical flat 54 is tilted slightly clockwise to compensate for the upward shift of the first reference element 15 by offsetting the first light beam 24 downward it will have a corresponding downward offset effect on the second light beam 25 to compensate in part for the upward shift of the second reference element 16 as the test specimen yields in tension. Since the stretching of the test specimen causes the second reference element 16 to shift further than the first reference element 15 the offsetting effect of the tilted optical flat 54 is insufficient to keep the second image centered on the pair of phototubes 42a and 42b. Additional downward offset of the second light beam 25 to complete the compensation for the upward shift of the second reference element 16 is accomplished by lowering of the relatively large reflecting prism 60. Thus the downward shift of the relatively large reflecting prism 60 that is necessary to keep the second image centered on the second pair of phototubes 42a and 42b measures the increase in the distance between the two reference elements 15 and 16 and thus measures the extent to which the test specimen is deformed by the applied stress.

For the purpose of rocking the optical flat 54 as required to keep the first image on the first pair of phototubes 30a and 30b, the optical flat is mounted on a pivot 65 and with a relatively long fixed arm 66. The arm 66 is pulled upward by a coil spring 68 against a cam 70 that is operated by the first servo motor 35. Up and down shift of the relatively large reflecting prism 60 is accomplished by mounting the prism on a link 71 that is pivotally connected to a lever 72 that is fulcrumed on a pivot 74. The lever 72 is pulled by a spring 75 against a cam 76 that is operated by the second servo motor 46. To keep the relatively large reflecting prism 60 vertical as it is swung up and down, the link 71 is both pivotally connected to the lever 72 and is also pivotally connected to a short arm 78. The short arm 78 is parallel to the arm of the lever 72 to which the prism 60 is attached and is of the same length as the lever arm.

Since the swinging movement of the lever 72 corresponds to the degree to which the specimen is stretched between the two reference elements 15 and 16, the strain or deformation of the test specimen that results from the applied stress may be indicated by suitable means that is responsive to the oscillations of the lever 72. In this particular embodiment of the invention the outer end of the lever 72 is operatively connected to a rectilinear transducer 80 which may comprise essentially an electrical coil with a movable core. The transducer 80 is connected by an amplifier 82 to a meter 84 that is calibrated for direct reading of the strain values. An important feature of the invention is that a suitable recorder 85 may be connected to the amplifier 82.

Instead of providing reference elements in the form of integral enlargements of the test specimen, separate reference elements may be provided that clamp onto the test specimen. By way of example, FIG. 5 shows a spring clip 86 which resiliently engages a test specimen 10a. The C-clamp or reference target 86 may be made of the same material as the test specimen or may be made of some other material having great heat resistance and, if desired, the reference target may be coated with a suitable ceramic.

In some instances, a test specimen is initially bowed so that an applied stress in tension causes one longitudinal side to stretch a great deal while the other longitudinal side stretches less or not at all. In such an instance, the measurement of the strain along one longitudinal side or the other would be erroneous. A further feature of the invention is the concept of meeting this problem by using one sensing means to respond to one of the two reference means on one longitudinal side of the specimen and to have the other sensing means respond to the reference means on the other longitudinal side of the specimen. FIG. 5a, for example, shows how one pair of phototubes may receive an image of the right half of one of the two reference means with the other pair of phototubes receiving the image of the left half of the other reference means. The result is that the strain effects on the two longitudinal sides of the specimen are averaged.

FIG. 6 illustrates a second embodiment of the invention in which the two image-projecting beams 24a and 25a are not optically offset but shift with the two corresponding reference elements 15 and 16. The corresponding images are maintained on the corresponding pairs of phototubes by shifting the phototubes.

In FIG. 6 the first image-forming light beam 24a is centered on a pair of multiplier phototubes 90a and 90b and the second image-forming light beam 25a is centered on a second pair of multiplier phototubes 92a and 92b. The two phototubes 90a and 90b are connected to a null detector 94 through a corresponding pair of input amplifiers 95a and 95b and the null detector 94 is connected in turn to a servo motor 96 by means of a servo amplifier 98. The two phototubes 90a and 90b are mounted on a common carriage 100 and the servo motor 96 shifts the carriage as required by means of a screw member 102.

In like manner the second pair of phototubes 92a and 92b are connected to a null detector 104 by a corresponding pair of input amplifiers 105a and 105b. The null detector 104 is connected in turn to a servo motor 106 by a servo amplifier 108. The two phototubes 92a and 92b are mounted on a common carriage 110 and the servo motor 106 controls the carriage by means of a screw member 112.

A differential transducer 114 is mounted by a bracket 115 on the carriage 100 and has a core 116 that is mounted by a bracket 118 on the carriage 110. It is apparent that in measuring the changes in distance between the two pairs of phototubes, the differential transducer 114 measures the changes in distance between the two reference elements on the test specimen. The differential transducer 114 may be connected by an amplifier 120 to a meter 112 which is calibrated for direct reading of strain magnitudes.

Our description in specific detail of the selected embodiments of the invention will suggest various changes, substitutions and other departures from our disclosure within the spirit and scope of the appended claims.

We claim:

1. In a system for measuring the strain of a specimen, the combination of: a first distinctive reference element and a second distinctive reference element located at spaced points on the specimen whereby the distance between the reference elements varies with the deformation of the specimen; a first means to project an image of said first reference element and a second means to project an image of the second reference element; a first photosensitive means and a second photosensitive means; a first means to shift said image of the first reference element and a second means to shift the image of said second reference element; a first means responsive to said first photosensitive means to control said first image-shifting means to keep the image of the first reference element on the first photosensitive means; a second means responsive to said second photosensitive means to control said second image-directing means to keep the image of the second reference element on the second photosensitive means; and indicating means responsive to said first and second responsive means to indicate the magnitude of the relative movement between the two distinctive reference elements.

2. In a system for measuring the strain of a specimen, the combination of: a first distinctive reference element and a second distinctive reference element located at spaced points on the specimen; a first means to direct an image of said first reference element and a second means to direct an image of the second reference element; a first photosensitive means and a second photosensitive means; a first means responsive to said first photosensitive means to shift both of said image-directing means equally as required to keep the image of the first reference element on the first photosensitive means; and a second means respective to said second photosensitive means to cause additional shift of said second image-directing means as required to keep the image of the second reference element on the second photosensitive means whereby the additional shift of the second image-directing means measures the changes in distance between the two reference elements.

3. A combination as set forth in claim 2 which includes means responsive to said second responsive means to indicate the changes in the distance between the reference elements.

4. In a system for measuring the strain of a specimen, the combination of: a first distinctive reference element and a second distinctive reference element located at spaced points on the specimen whereby the distance between the two reference elements varies with the deformation of the specimen; a first photosensitive means to receive a beam of light imaging the first reference element; a second photosensitive means to receive a beam of light imaging the second reference element; a light transmitting means having parallel opposite faces intercepting both of said beams to shift both of the beams equally; means responsive to said first photosensitive means to control said light transmitting means to maintain the image of the first reference element on the first photosensitive means; and means responsive to said second photosensitive means to shift said second mentioned beam a second time as required to keep the image of the second reference element on the second photosensitive means thereby to measure the relative movement between the two reference elements.

5. A method of measuring the strain of a specimen under stress, characterized by the steps of: providing reference elements of distinctive configuration at two spaced points on the specimen; providing two beams of light for projecting images of the two reference elements respectively; directing the two beams of light to project the two images on two fixed points before the specimen is stressed; shifting both of the two beams equally as necessary to keep one of said images on the corresponding fixed point as the specimen is stressed; shifting one of the two beams a second time as necessary to keep the other image on the other fixed point as the specimen is stressed; and measuring the degree to which the last mentioned beam is shifted the second time.

References Cited in the file of this patent

UNITED STATES PATENTS

| | | |
|---|---|---|
| 1,714,638 | Scott | May 28, 1929 |
| 2,237,811 | Cockrell | Apr. 8, 1941 |
| 2,514,985 | Banner | July 11, 1950 |
| 2,548,590 | Cook | Apr. 10, 1951 |
| 2,563,892 | Waller et al. | Aug. 14, 1951 |
| 2,674,151 | Garrett et al. | Apr. 6, 1954 |
| 2,674,917 | Summerhayes | Apr. 13, 1954 |
| 2,712,772 | Trombe | July 12, 1955 |
| 2,891,239 | Parsons | June 16, 1959 |
| 2,917,920 | Robinette et al. | Dec. 22, 1959 |
| 2,931,917 | Beelitz | Apr. 5, 1960 |
| 2,969,707 | Hansen | Jan. 31, 1961 |